United States Patent

[11] 3,578,756

[72] Inventors Fred D. Evans
Oviedo;
Carlos L. Springfield, Titusville; Coleman
J. Bryan, Merritt Island, Fla.
[21] Appl. No. 845,971
[22] Filed July 30, 1969
[45] Patented May 18, 1971
[73] Assignee The United States of America as represented
by the Administrator of the National
Aeronautics and Space Administration

[54] AUTOIGNITION TEST CELL
1 Claim, 3 Drawing Figs.
[52] U.S. Cl. ................................................ 73/15, 73/432
[51] Int. Cl. .............................................. G01n 25/00
[50] Field of Search ..................................... 73/15, 432

[56] References Cited
UNITED STATES PATENTS
3,049,913 8/1962 Hunt ........................... 73/432
3,238,784 3/1966 Dorsey et al. ............... 73/425
3,292,417 12/1966 Hayden et al. ............... 73/15
3,298,220 1/1967 Stone et al. .................. 73/15
3,396,584 8/1968 Badin et al. .................. 73/432

Primary Examiner—James J. Gill
Assistant Examiner—Herbert Goldstein
Attorneys—James O. Harrell and G. T. McCoy ABSTRACT: A chamber for analyzing test samples of materials, such as used in spacecrafts, under certain predetermined environmental conditions in order to determine autoignition temperatures and degree of decomposition is controlled atmospheres. The apparatus includes an elongated hermetically sealed cylindrical chamber which has a plurality of couplings carried thereon. A vacuum pump, a source of gas, a bubbler system which bubbles through a mercury bath, a valve and other various items may be coupled to the couplings in order to produce predetermined environmental conditions within the chamber. The chamber is also provided with a viewing port and a thermocoupled probe for measuring the temperature of the test sample.

PATENTED MAY 18 1971
3,578,756
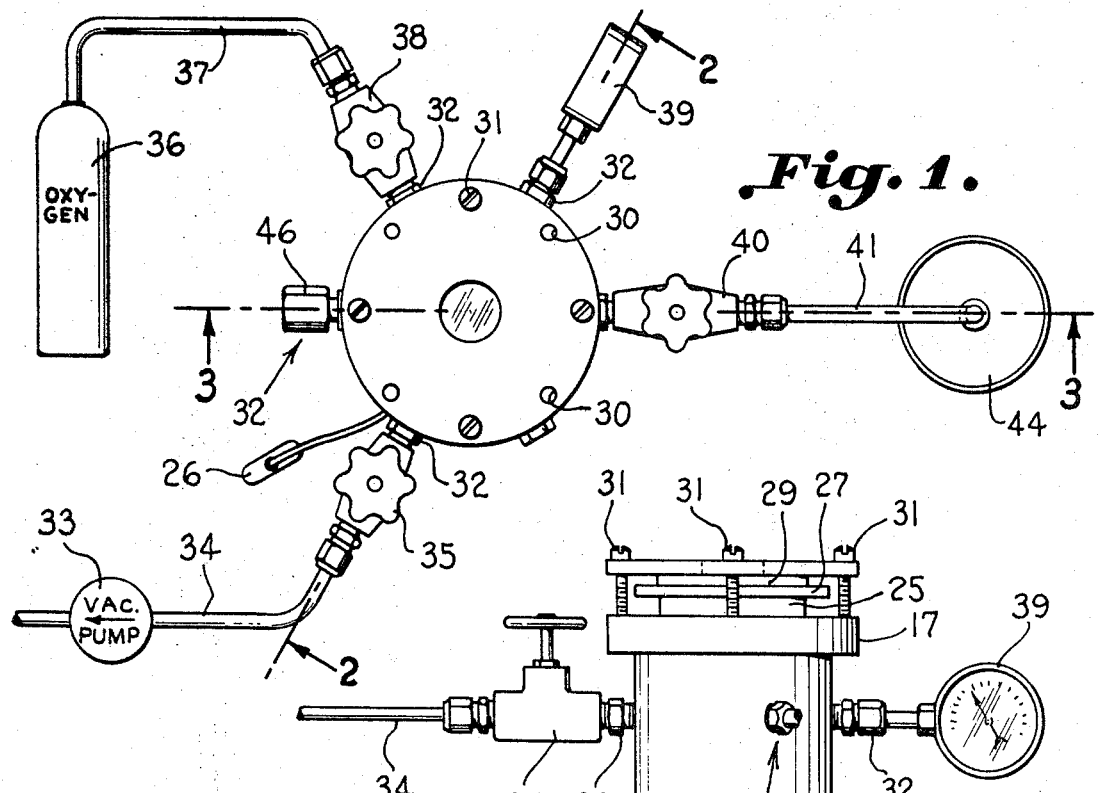
Fig. 1.
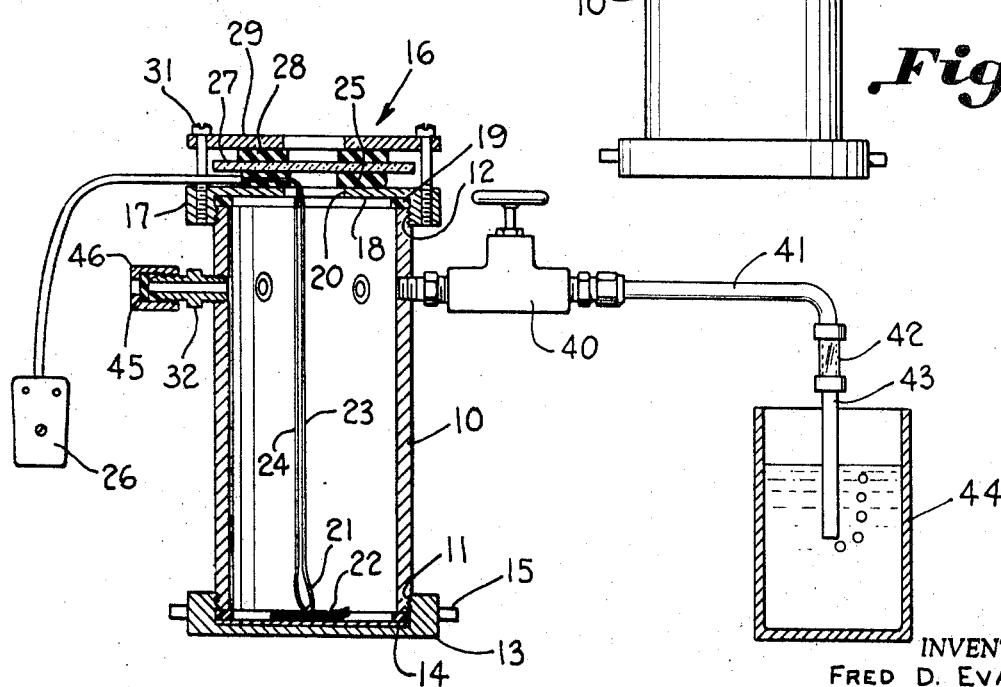
Fig. 2.
Fig. 3.
INVENTORS.
FRED D. EVANS
CARLOS L. SPRINGFIELD
BY & COLEMAN J. BRYAN
James O. Harrell
ATTORNEYS.

AUTOIGNITION TEST CELL

This invention described herein was made by employees of the United States Government, and may be manufactured and used by or for the Government for Governmental purposes without the payment of any royalties thereon or therefor.

This invention relates to an apparatus for analyzing test samples, and more particularly to an apparatus wherein the environmental condition can be readily controlled during the testing procedure.

One of the most dangerous and conscious problems encountered by persons working in confined areas is fire. This is especially true of astronauts in spacecrafts, as well as personnel aboard ships and the like. While the autoignition temperature of most materials is known under normal atmospheric conditions, such is frequently not known in certain environmental conditions as one would encounter in space vehicles.

In view of the rather recent development of the various synthetic fabrics, it is important to provide a simple and convenient method of testing samples of such material in order to determine the autoignition temperature in various environmental conditions, as well as to determine if any decomposition of the material takes place.

In accordance with the present invention it has been found that samples can be analyzed to determine the autoignition temperature, and if decomposition takes place by using an autoignition test cell constructed in accordance with the present invention. This autoignition test cell includes the following basic parts: (1) an elongated rigid cylindrical chamber, (2) a hermetically sealed bottom screwed on one end of the cylindrical chamber, (3) a hermetically sealed top assembly carried on the chamber which has a transparent portion for permitting viewing of the interior of the chamber, (4) a thermocoupled probe positioned in the chamber adjacent the test sample, (5) a plurality of couplings carried by the chamber providing communications with the interior of the chamber, (6) a vacuum pump coupled to one of the couplings for evacuating the test cell prior to running a test on the sample, (7) a source of gas, such as oxygen, coupled to another coupling for selectively producing a particular environmental condition within the chamber, (8) a mercury bubbler coupled by means of a tube to another coupling for maintaining a constant predetermined pressure within the chamber, and (9) a hermetically sealed septum coupled to one of the couplings so that gas samples can be taken from the interior of the chamber by means of a hypodermic syringe. Heat can be applied to the test sample and chamber by immersing the chamber in a liquid heat bath. Thus, a test sample can be exposed to various temperatures in a particular environment.

Accordingly, it is an important object of the present invention to provide an autoignition test cell for determining the autoignition temperature of various samples in a predetermined environmental condition.

Another important object of the present invention is to provide a simple and efficient test cell wherein test samples can be analyzed and decomposition of the test samples can be readily checked by use of a hypodermic syringe.

Still another important object of the present invention is to provide a simple and efficient test cell wherein a predetermined pressure can be maintained within the cell as the temperature is varied during a test.

Other objects and advantages of this invention will become more apparent from a reading of the following detailed description and appended claims, taken into conjunction with the accompanying drawing wherein:

FIG. 1 is a top plan view of an autoignition cell constructed in accordance with the present invention, FIG. 2 is a side elevational view taken along line 2—2 of FIG. 1, and FIG. 3 is a cross-sectional elevational view illustrating the interior of the autoignition test cell taken along line 3—3 of FIG. 1.

Referring in more detail to the drawing, the apparatus includes a rigid elongated cylindrical chamber 10 which has threaded portions 11 and 12 adjacent the bottom and top thereof, respectively. The chamber may be constructed of any suitable pipe, and in one particular example it has a 3 ½-inch inside diameter. A cup-shaped bottom 13 is screwed on the threaded portion 11 of the chamber 10 and has an O-ring 14 carried therein for producing a hermetically sealed relationship. Diametrically opposed protruding projections 15 extend outwardly from the bottom for providing a convenient means of securing the test cell within a suitable jig (not shown).

A hermetically sealed top assembly, generally designated by the reference character 16, is provided for closing the top of the chamber, while permitting viewing into the interior. The top assembly includes a cup-shaped top cover 17 which has internal threads so that such can be screwed on the threads 12 carried on top of the chamber 10. Positioned between the top of the chamber 10 and a flat top portion 18 of the top cover 17 is an O-ring 19. The top portion 18 of the top cover 17 has an opening 20 in the middle thereof through which a thermocoupled probe 21 extends for measuring the temperature of a test sample 22 carried on the bottom cover 13. Leads 23 and 24 which are connected to the thermocoupled probe extend through the opening 20 and a silicon rubber gasket 25 to a plug 26 carried on the exterior of the test cell which can be readily connected to any suitable meter for indicating temperature.

Positioned on top of the silicon rubber gasket 25 is a glass cylindrical view port 27. Carried on top of the view port 27 is another silicon rubber gasket 28 upon which a metallic view port attaching plate 29 is carried. It is noted that the view port attaching plate 29 and the silicon rubber gaskets 25 and 28 have holes in the center portion thereof, which correspond to the hole 20 in the top cover for permitting viewing within the interior of the test chamber. All of the members forming the top assembly are circular in shape. Circumferentially spaced holes 30 are provided adjacent the perimeter of the view port attaching plate 29 for receiving bolts 31 which are screwed in corresponding threaded holes in the top cover for drawing the view port attaching plate 29 thereto. When the bolts 31 are drawn tight the top assembly 16 is hermetically sealed. The pressure exerted on the top of the silicon-controlled rubber gasket 25 is great enough to completely seal the wires 23 and 24 extending therethrough in order to prevent air from escaping.

A plurality of couplings, generally designated by the reference character 32, are circumferentially spaced in the wall of the chamber 10 for providing communications with the interior thereof. A vacuum pump 33 is attached by means of line 34 to a control valve 35 which is, in turn, coupled to one of the couplings 32 so that the chamber can be evacuated. A source of gas, such as oxygen tank 36, is coupled by tubing 37 through a valve 38 to another coupling member 32. A pressure gauge 39 is coupled to still another valve 32 for indicating the pressure within the chamber.

In order to maintain a constant pressure within the chamber during a test one of the coupling members 32 is coupled through a valve 40, a bubbler tube 41, a viewing coupler 42, to a tube 43 which is immersed in a mercury bath 44. By allowing the gas from the chamber 10 to bubble through the mercury bath 44 s the pressure within the chamber is increased such maintains a constant pressure within the chamber. The pressure at which the chamber is maintained is controlled by the depth that the tube 43 is immersed within the mercury.

It is also frequently desired during a test to take samples of the gas within the chamber 10 so that such can be analyzed to determine if the test sample is outgassing. This is accomplished without interrupting the test by using a hypodermic syringe and inserting such through a hermetically sealed septum 45. The septum is carried on the end of a coupling 32 by means of a cup-shaped lug 46, which is threaded on the end of the coupling, and has an opening in the end thereof for providing access to the septum 45. The septum 45 is constructed of any suitable material that will seal itself after the hypodermic syringe is removed therefrom.

Heat can be applied to the chamber and test sample by any suitable means, such as a hot liquid metal bath which has a low melting alloy therein, such as woods metal, which melts at approximately 140°F. The chamber is usually placed in a jig by means of the projections 15 carried on the bottom cover 13, and such is immersed partially within the metal bath. Any suitable means (not shown) can be used for closely regulating and controlling the temperature of the liquid bath. When it is desired to analyze a test sample first the top lid assembly 16 is removed from the test cell and the chamber 10 and the top lid assembly are both placed in an oven at 300° F. for at least an hour so as to sterilize the chamber. The chamber and top assembly are then removed and placed in a clean environment and allowed to cool below 90°F. The time required to cool is approximately 1 hour. The test sample, which may be a piece of fabric, that is to be used in a spacecraft is placed in the chamber 10 on the bottom cover 13 with the thermocouple 21 in contact with the center thereof.

The top assembly is then placed on the chamber 10 and valve 35 is opened allowing the vacuum pump 33 to evacuate the chamber to approximately 0.2 p.s.i.a. The valve 35 is then closed and valve 38 is opened allowing the oxygen from tank 36 to flow through line 37 into the chamber until the pressure reaches approximately 17 p.s.i.a. This pressure reading is observed on the pressure gauge 39. The test cell is then allowed to set for approximately 30 minutes with all of the valves closed except that connected to the pressure gauge 39 so as to determine if there are any leaks therein. The pressure gauge reading should remain constant for this period. If it is desired to make the first test at approximately 150°, then the chamber is placed in a water bath and the valve 40 interposed in line 41 is opened to maintain the constant pressure within the chamber. By positioning the tube 43 within the mercury bath 44 and simultaneously observing the pressure gauge 39 it can be determined the exact depth at which the tube should be positioned in order to maintain 16.5 p.s.i.a. After the temperature of the test sample 22 has reached 150° and remains there for not less than 5 minutes or more than 15 minutes an analytical sample is taken of the gas within the chamber by inserting a hypodermic syringe through the septum 45 and withdrawing gas therefrom. The sample temperature remains at 150° plus or minus 5° for approximately 5 hours, and then another analytical sample is taken with the hypodermic syringe. When it is desired to analyze a sample in an oxygen environment at a higher temperature the bubbler valve 40 is closed and the chamber 10 is placed in a metal bath which has a low melting alloy, such as woods metal therein, and the temperature of such is increased to approximately 400°F. The bubbler valve 40 is opened so as to maintain a constant pressure of 16.5 p.s.i. within the chamber. Normally, it is desired that the heating rate is such that the sample temperature reaches 400° plus or minus 10° F. in 5 to 25 minutes. The test cell remains in the bath with the bubbler valve 40 open and the sample temperature at 400° plus or minus 10° F. for 5 minutes. Analytical samples are taken by use of a hypodermic syringe being inserted through the septum 45 at various times. After the desired number of analytical samples have been taken at the 400° level all of the valves are closed and the chamber 10 is removed from the metal bath. The sample can then be removed from the chamber for physical inspection to determine if any deterioration of such took place. One reason for taking the gas samples during the test is to determine if there is any outgassing at the various temperatures from the sample.

The above analytical test is merely an example of one such test which could take place within the chamber, and it is to be understood that many different tests could be performed, and gases other than oxygen could be inserted within the chamber to create the environmental condition.

We claim:
1. An apparatus for analyzing a test sample from materials such as used in spacecrafts under certain predetermined environmental conditions comprising:
   A. an elongated cylindrical chamber having threaded ends;
   B. a hermetically sealed bottom having a threaded portion engaged with one of said threaded ends of said cylindrical chamber;
   C. said test sample adapted to be positioned in said cylindrical chamber on said hermetically sealed bottom;
   D. a hermetically sealed top assembly including;
      1. a top cover having a threaded portion engaged with the other threaded end of said cylindrical chamber;
      2. an opening in the center of said top cover;
      3. a first gasket positioned on said top cover and having an opening therein;
      4. a piece of glass positioned on top of said first gasket;
      5. a second gasket positioned on top of said piece of glass and having an opening therein; and
      6. an attachment plate engaging said second gasket and detachably connected to said top cover and having an opening therein; whereby said openings in said top cover, said first and second gaskets and said attachment plate provide a view port for inspecting said test sample;
   E. a thermocoupled probe having one end engaging said test sample and the other end extending through said first gasket;
   F. a plurality of couplings carried by said cylindrical chamber for providing communication with the interior thereof;
   G. a vacuum pump coupled to one of said couplings for evacuating said cylindrical chamber prior to running a test on said test sample;
   H. a source of gas coupled to another of said couplings for selectively producing a particular environmental condition within said cylindrical chamber;
   I. a mercury bath;
   J. a tube having one end coupled to another of said couplings and the other end immersed in said mercury bath for maintaining a constant predetermine pressure within said cylindrical chamber; and
   K. means for heating said cylindrical chamber, whereby said test sample can be exposed to various temperatures in a predetermined environment.